UNITED STATES PATENT OFFICE.

ATKINSON CROSSLEY, OF TALYWAIN, ENGLAND.

PROCESS OF MANUFACTURING ZINC.

SPECIFICATION forming part of Letters Patent No. 544,612, dated August 13, 1895.

Application filed May 13, 1895. Serial No. 549,155. (No specimens.)

*To all whom it may concern:*

Be it known that I, ATKINSON CROSSLEY, manufacturing chemist, a subject of the Queen of Great Britain, residing at Talywain, near Pontypool, in the county of Monmouth, England, have invented a certain new and useful process for the manufacture of zinc oxides, sulphates, and sulphides from zinc ashes, zinc-blende, carbonate of zinc, and other ores of a complex nature, such as ores containing lead, zinc, silver, copper, manganese, iron, or other metals in combination, and for extracting such metals; and I do hereby declare that the following is a full, clear, and exact description of the invention, which will enable others skilled in the art to which it appertains to make and use the same.

My present invention relates to an improved process for the manufacture of zinc oxides, sulphates, and sulphides from zinc ashes, zinc-blende, carbonate of zinc, and other ores of a complex nature—such as ores containing lead, zinc, silver, copper, manganese, iron, or other metals in combination, and for extracting such metals.

Ores of the nature described are ordinarily exceedingly difficult to treat successfully, and my invention has for its object a novel method or process of treatment by which the required result can be obtained successfully, easily, and economically.

In order to put my invention in operation, I first take the sulphides of the metallic ores described and I roast them for the purpose of converting those that are convertible to their oxides and sulphates in a roasting-furnace of the kind described and shown in the specification of United States patent granted to me for apparatus for producing oxides, dated December 25, A. D. 1894, and numbered 531,459. Any other suitable furnace may, however, be used. The gases are conducted from such furnace by tunnels or flues into acid-chambers of the kind usually used, for the purpose of manufacturing sulphuric acid. The ores are then ready for treatment by the following process. Ores, however, such as calamine, zinc ashes, skimmings from galvanizers' works, and the like, do not require such preliminary roasting, but can be treated direct.

According to the proportion of metal contained in each or any of the beforementioned ores or waste products, so much sulphuric acid is added as is necessary to dissolve the same and is heated with the ores at a concentrated strength in a cast-iron steam-jacketed pan, in order to convert any lead therein contained to an insoluble lead sulphate, and is then diluted with water to such a degree that the zinc, iron, manganese, and copper, if any, are dissolved. The clear liquor is afterward filtered off, leaving the residual ore of lead, (and silver or gold, if any be present,) from which I obtain the lead by smelting. The clear acid sulphate liquor is then treated with sulphureted hydrogen or the sulphide of any of the alkaline metals, preferably sodic sulphide, in the proper proportions to remove the copper, which at once precipitates the copper as copper sulphide, the other metals remaining in solution; or, instead of precipitating the copper as copper sulphide the clear acid sulphate liquor may be treated by the addition of metallic zinc or by electrolytic action—for instance, by immersing in it copper and zinc plates electrically connected—in which case the copper is precipitated in a spongy metallic form. The liquor is then again filtered from its precipitate and is again treated with an alkali (ammonia, by preference) until neutral, when a stream of chlorine gas (or chlorine in the form of a compound) is passed into it until all the manganese and iron are sufficiently oxidized to form manganic oxide and ferric oxide, when they are thrown down by a slight excess of ammonia. The reactions for iron and those for manganese are practically identical and are as follows:

$$H_3N + H_2O = NH_4OH.$$
$$FeSO_4 + 2NH_4OH = (NH_4)_2SO_4 + Fe(OH)_2.$$
$$2Fe(OH)_2 + 2NH_4HO + 2Cl = Fe_2(HO)_6 + 2NH_4Cl.$$
$$Fe_2(HO)_6 = Fe_2O_3, 3H_2O.$$

In other words, the ammonia combines with the water to form ammonium hydrate, the ferric sulphate combines with the ammonium hydrate to form ammonium sulphate and soluble ferrous hydrate, and the ferrous hydrate combines with the excess of ammonium hydrate and chlorine to form ferric hydrate, which is deposited, and ammonium chloride. When the liquor has been sufficiently treated by this process, a further excess of ammonia is added to bring into a state of solution all the zinc oxide, the liquor is again filtered from its solution, and the ammonia is then distilled off or rendered neutral by the addition of an acid and recovered—that is to say, the free ammonia, not being a sulphate. The zinc oxide is thrown down and the liquor is again filtered from precipitate, and is then treated by any of the well-known methods to recover the ammonia, which may be used over again in the said manufacture. The zinc oxide is well washed from all traces of alkaline sulphates, dried, and is then put into a muffle-furnace and heated for such a time and at such a heat as is necessary to give it the required density and body for use as a pigment for various purposes in the arts.

Since hydrogen sulphide has essentially the same reactions in the herein-described process as the sulphides of the alkaline metals, I consider it as the chemical equivalent of any one of the said sulphides.

Sulphides of zinc are made by a similar process, except that after the iron and manganese are got rid of, as described, the liquor is again made acid and sulphureted hydrogen passed through it, and the zinc thrown down as a precipitate of zinc sulphide, which is washed and dried and is then ready for use. Zinc sulphate can also be made by this process of purification, and is crystallized from the acid liquor instead of being precipitated.

I am aware that it has been proposed to treat complex ores containing lead, zinc, and other metals by first roasting such ores and subsequently treating them with acid to dissolve the metals contained in them, and I do not claim, broadly, such process; but

What I claim, and desire to secure by Letters Patent, is—

1. The process for the manufacture of zinc oxide, which consists in adding sulphuric acid to the metallic ores or compounds, heating the mixture and converting the lead present to an insoluble salt, and depositing any silver or gold present, then diluting with water and converting the other metals present to soluble salts, filtering off the clear liquor, then treating the clear acid liquor filtered off with an alkaline sulphide, precipitating the copper as copper sulphide, then filtering the liquor from the precipitate, treating with an alkali until neutral, passing chlorine into it until all manganese and iron present form manganic and ferric oxides, which are thrown down by a slight excess of alkali, adding an excess of alkali to bring the zinc oxide into solution, and then precipitating the zinc oxide, and filtering off the liquor therefrom, substantially as set forth.

2. The process for the manufacture of zinc oxide from the metallic ores or compounds, which consists in adding sulphuric acid to the said ores or compounds, heating the mixture, and converting the lead present into insoluble sulphate and leaving as a deposit any gold, silver, or like metals not attacked by the acid, then diluting the solution with water and converting the other metals present into soluble salts, filtering off the clear liquor, and then removing the copper from the solution, then treating the acid solution with an alkali, passing chlorine into it until all the manganese and iron present form manganic and ferric oxides, and continuing the addition of the alkali until these are precipitated, adding an excess of alkali to bring the zinc oxide into solution, and then precipitating the zinc oxide, and filtering off the liquor therefrom, substantially as described.

In testimony whereof I have hereunto set my hand in the presence of two subscribing witnesses.

ATKINSON CROSSLEY.

Witnesses:
ARTHUR E. EDWARDS,
WALTER E. SYKES.